United States Patent [19]
Bentzinger

[11] 3,976,250

[45] Aug. 24, 1976

[54] IRRIGATION DEVICE

[76] Inventor: Harlan A. Bentzinger, 928 E. Canton Road, Edinburg, Tex.

[22] Filed: Mar. 7, 1975

[21] Appl. No.: 556,454

Related U.S. Application Data

[63] Continuation-in-part of Ser. No. 415,536, Nov. 14, 1973, abandoned.

[52] U.S. Cl. ............................ 239/533; 239/542; 222/335
[51] Int. Cl.² ........................................ B05B 1/30
[58] Field of Search ............ 239/542, 99, 266–269, 239/327, 547, 450, 533, 571, 534, 572, 574; 222/335, 450

[56] References Cited
UNITED STATES PATENTS

| | | | |
|---|---|---|---|
| 3,606,157 | 9/1971 | Chapin | 239/542 |
| 3,788,544 | 1/1974 | Koskinenm | 239/534 |
| 3,797,738 | 3/1974 | Fitzhugh | 239/542 |

*Primary Examiner*—John J. Love
*Attorney, Agent, or Firm*—Barlow & Barlow

[57] ABSTRACT

An irrigation system is disclosed which includes a source of fluid under pressure which can be supplied by a pump or from domestic water sources and a system of irrigation pipes which contain a plurality of pressure vessels, the system of irrigation line being controlled by valves. Each of the pressure tanks is connected to the irrigation line by an inlet port containing a check valve means and each of the pressure tanks has an outlet port which is controlled by a diaphragm-type valve, the operator inside of which is connected to the irrigation line. The irrigation line is controlled in such a manner that the tank alternately builds up pressure and the line is reduced in pressure to atmospheric permitting the tank to discharge.

4 Claims, 5 Drawing Figures

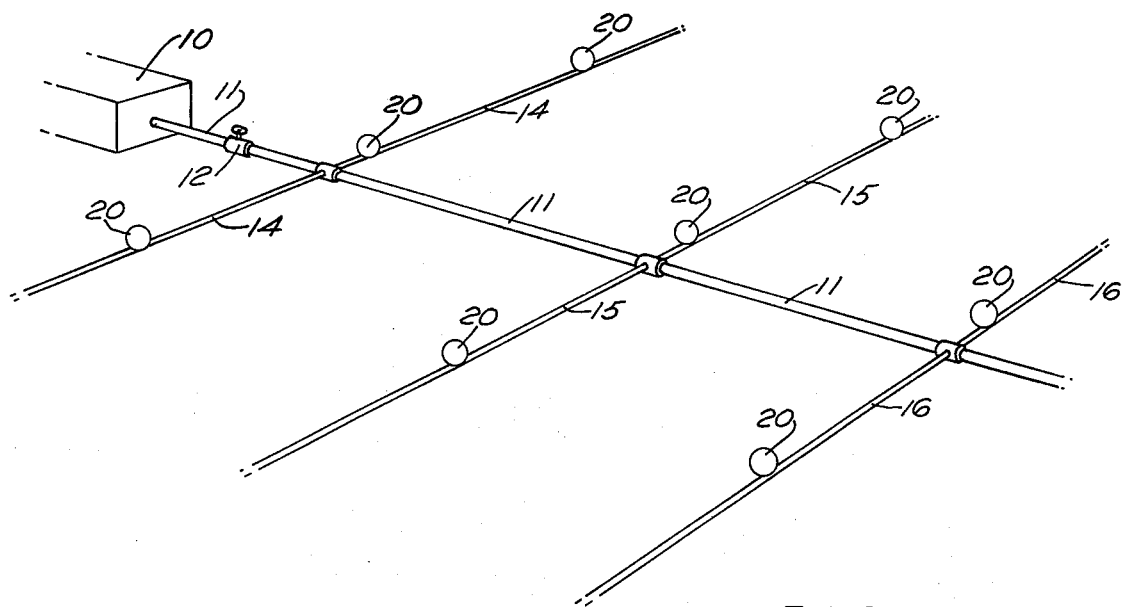
FIG. 1
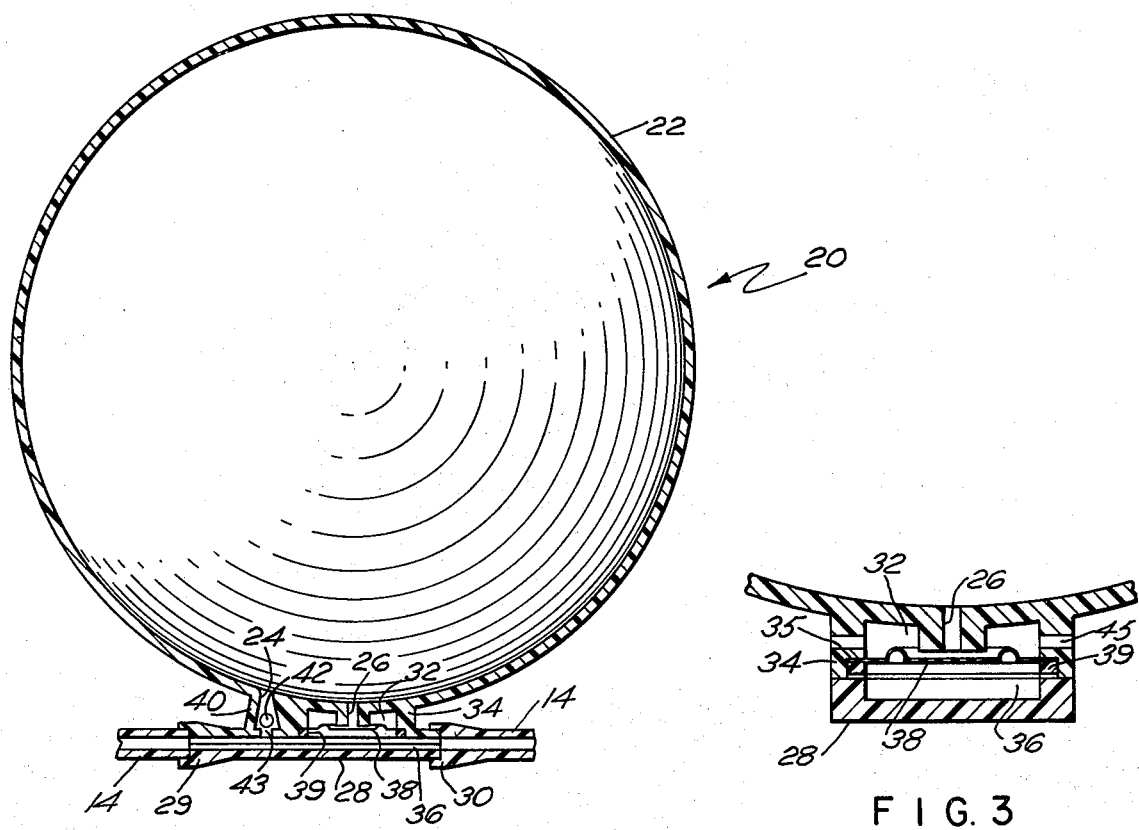
FIG. 2
FIG. 3

IRRIGATION DEVICE

CROSS REFERENCE TO RELATED APPLICATION

This application is a continuation-in-part of my earlier filed application Ser. No. 415,536, filed Nov. 14, 1973 now abandoned.

BACKGROUND OF THE INVENTION

Irrigation systems that have been utilized in the past generally consisted of a number of spray orifices which discharge water in rather large area over a predetermined time. Recent developments have indicated that it is possible to irrigate with substantially less water than by spray irrigation or flood irrigation by applying water to crops in small quantities and utilizing subsurface irrigation where moisture moves into the soil through the hairline crack therein. When water is applied in small amounts, less water is lost in evaporation and runoff. The present system of applying water in small quantities is through the use of an orifice through which water may trickle from irrigation pipes that are laid out in the normal grid-like manner as disclosed in U.S. Pat. No. 3,547,355. When a small orifice is utilized, clogging of the orifice occurs due to particles that are entrained in the water system. Additionally, orifices are responsive to pressure in the line and the flow through each orifice has to be adjusted down the line so that the decrease in pressure as one gets near the end can be compensated for. This means in practice that each orifice has to be individually adjusted.

SUMMARY OF THE INVENTION

An irrigation system is provided in which fluid, such as water, sometimes mixed with fertilizer, is supplied under pressure through a supply conduit which has a control valve therein and thence to a number of discharge devices. Each of the discharge devices comprises a pressure vessel having an inlet port having a check valve therein and an outlet port. The outlet port is controlled preferably by a diaphragm actuated valve which in its simplest form can merely be a diaphragm stretched across the outlet port, one face thereof being exposed to the conduit of the irrigation system or stated another way to the inlet port on the supply side of the check valve. With this type of distribution construction the outlet port can be made rather large and will eliminate any problem of clogging of suspended solids that are in the fluid. For example, if the material in the fluid is herbicide or weedicide or fertilizers, ordinary sprinkler systems may not pass any suspended solids that might be present with this type of chemical and further this type of metered discharge with the material within the main irrigation is preferable to the sprinkler system which tends to wash away chemicals that are really designed to remain on the surface. The main object of the invention therefore is to provide an irrigation discharge device for furnishing metered amounts of fluid to the soil.

DESCRIPTION OF THE DRAWINGS

FIG. 1 is a diagrammatic view of a portion of a typical irrigation system;

FIG. 2 is a sectional view of an irrigation discharge device made in accordance with the invention;

FIG. 3 is an enlarged central partial sectional view showing the discharge port.

DESCRIPTION OF THE PREFERRED EMBODIMENT

Figure 4:
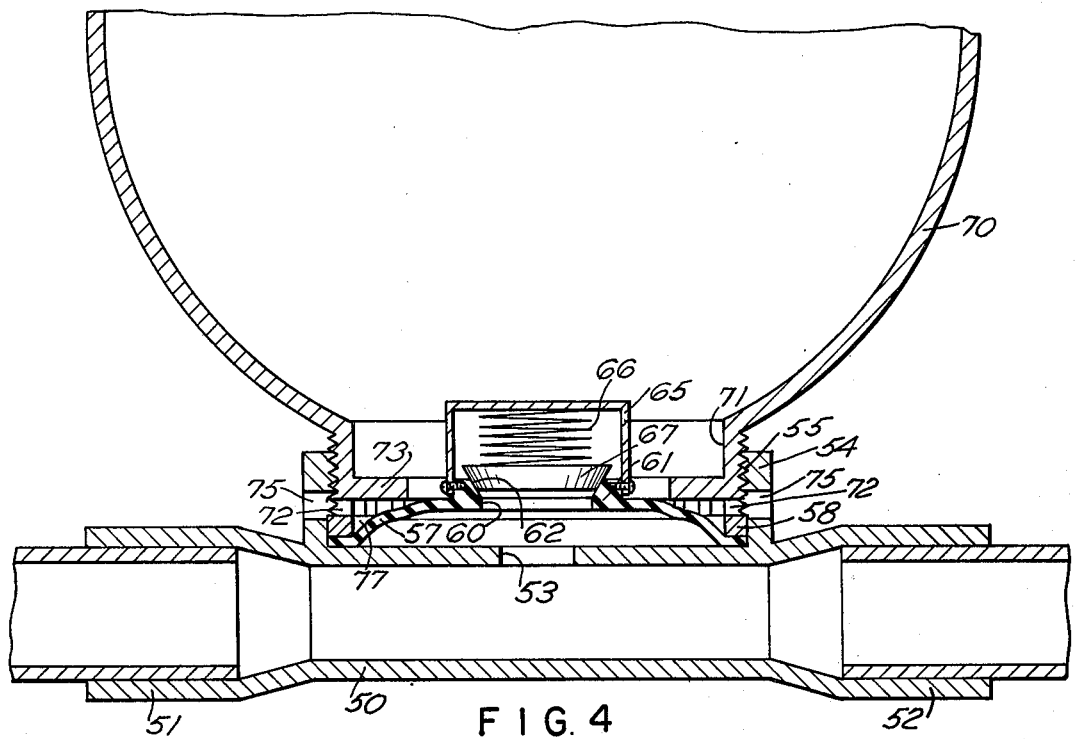
FIGS. 4 and 5 are enlarged central partial sectional views of alternate forms of devices made in accordance with the invention.

In FIG. 1 there is diagrammed a water source 10 which can take a variety of forms but generally in agriculture consists of a pump. From this pump the line 11 leads to a main valve 12 and then the main line goes from this valve out into the field. The main line 11 may be on the surface or buried and to it there can be connected a number of manifold lines 14, 15 and 16, for example. On the manifold or branch line such as 14, 15 and 16 and at suitable spaced intervals there is connected one of the discharge devices generally indicated 20 and shown in more detail in FIG. 2 to which reference is now made.

In FIG. 2 the device 20 is shown as a relatively large pressure vessel 22 shown as a sphere which has two openings therein, namely an inlet port 24 and an outlet port 26. For convenience in manufacture these are shown as being made integral with the pressure tank as a molded or cast boss along a side thereof. This cast boss has a tubular portion 28 to which the manifold line such as 14 and so forth might be connected as at 29 and also lead therefrom as at 30. Surrounding the outlet port 26 is an enlarged cavity 32 that is formed by a wall structure 34 and this wall structure 34 is substantially circular in plan and is counterbored as at 35 and into this counterbore there is inserted a diaphragm 38 which may be sealed therein by gasket 39. Also around the wall 34 surrounding the outlet port a number of discharge holes 45 are provided which allow fluid to pass through. As will be seen particularly by referring to FIG. 3, the bottom section 28 of the conduit may be secured to this wall 34 so that effectively the continuation of the line 14 is had in the area generally designated 36. Into the adjoining area, the inlet port 24 is formed by a wall section 40 and the common wall 34 about the outlet port. Within the inlet port a check valve is formed by a ball 42 which seats as at 43.

The operation of this device is relatively simple and can be understood by noting that water is supplied by the pump 10 to the main line 11 through a control valve 12. The vessel 22 is connected as has been stated before in one of the manifold lines such as 14, and water is admitted into this vessel through the check valve 42, 43 and inlet port 24. If there is pressure in the line 14 and within the area 36 underneath the vessel 22, the diaphragm 38 will move and close the outlet port 26. Water enters through the inlet port and check valve 42 at a pressure higher than diaphragm 38 closing pressure until the pressure in the line and the back pressure of the air in the vessel 22, which is compressed by the water being admitted therein, equalizes. Since the diaphragm area is larger than the area of the exhaust port 26, it will always remain closed as long as there is pressure in the line, and the opening pressure of check valve 42 is higher than that needed to close the diaphragm. Basically at this point in time, the pressure in the vessel 22 will be the pressure in the line 14 minus the check valve opening pressure. After all of the vessels such as 22 are filled, the valve 12 can be operated in such a way as to close the lead to the source of liquid under pressure at 10 and drain the main line and its connected manifolds. When the pressure in the lines 11, 14, 15 and 16 drop and effectively approach atmosphere, the pressure inside the vessel 22 is higher than the pressure being exerted against the diaphragm 38 by anything in the area 29, and the diaphragm, therefore, moves open and the water within the vessel 22 will be discharged through the outlet port 26 and the discharge holes or apertures 45. Water that is within the vessel 22 will go out through the inlet port 24 as this is now blocked by the check valve 42, 43.

DESCRIPTION OF THE ALTERNATE EMBODIMENT

In FIG. 4 there is shown an alternate form of an irrigation device made in accordance with the invention. In this case we have a fitting designated 50 which includes conduit connection enlargements as at 51 and 52 and a central section with an aperture 53 therein which is substantially central of a raised circular boss 54 which is provided with internal threads as at 55. Received within the raised circular boss 54 is a diaphragm 57 which is held in position in the boss by a spacer ring 58. The diaphragm 57 is provided with a central opening 60 forming an inlet port about which an enlarged portion 61 is molded to form a seat 62. On the enlarged portion or boss 61 is fastened a cage 65 and this cage supports a spring 66 which engages a valve plug 67 and forces the valve plug into normal engagement with the valve seat 62. A pressure vessel 70 is provided and this pressure vessel has a neck portion 71 with suitable external threads to engage the threads 55 of the boss 54. The neck portion has a plurality of slots 72 extending inwardly from the outer edge thereof and the inner surface of the neck has an inturned lip or wall portion 73 which forms a seat for the diaphragm 57 to work against. Through the wall 54 of the boss and around its circumference are a plurality of slots such as are indicated at 75 which slots communicate through slots 72 (When aligned) with the space 77 to form an outlet passage. If a proper choice of spacing is made, say 9 and 13 slots, there will be substantial alignment within 7° of arc in all positions. This avoids specific alignment of neck 71 and boss 54.

The arrangement is such that the diaphragm 57 will normally flex and be seated against its seating lip surface 73 when the pressure within the conduit is sufficiently high to force the diaphragm thereagainst. It will be apparent that if there be a lesser pressure within the vessel 70, than within the conduit, then water will be admitted through the check valve by raising of the valve plug 67 until the pressure equalizes and when it does equalize then the diaphragm will remain seated against the lip 73, the area facing the conduit being greater than the area above the lip. When the pressure drops within the line, the diaphragm will fall away from the lip and water within the pressure vessel 70 will be allowed to pass out through the spaces 77 and slots 72, 75.

Figure 5:
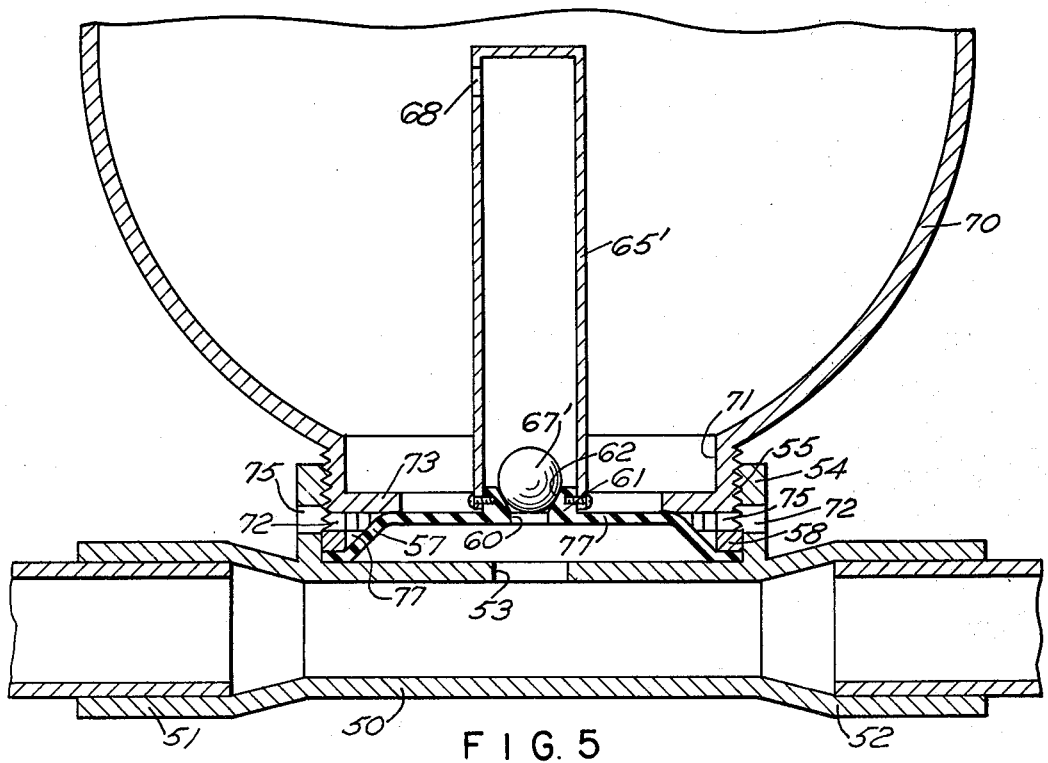

In FIG. 5 the same basic structural features have been shown with the exception of the manner in which the check valve is constructed. To this end, in lieu of a spider frame such as 65, there is provided a tube 65' which contains a ball 67' that would normally seat against the valve seat section 62. The tube 65' has a hole or aperture 68 near the top thereof. This arrangement works substantially identical to that in the previous embodiments except that as water enters the pressure vessel the pressure vessel having less pressure therein than is in the supply conduit, the ball will rise, but there must be sufficient pressure in the line to lift the water up to the hole or aperture 68 in the tube. The water pressure in the conduit will of course keep the diaphragm 57 against its lip 73 and should the pressure fall in the conduit, then the ball 67' will fall down against its seat 62. The diaphragm will flex downwardly and open a flow of water out of the pressure vessel through the slots 72, 75 as in the previous embodiment. The arrangement in the FIG. 5 embodiment is such that the column within the tube 65' is such to change the opening pressure of the check valve as related to the closing pressure of the diaphragm such that the check valve will have greater opening pressure than the closing pressure of the diaphragm. This physical result is achieved by the spring 66 in FIG. 4 and by the column of water within the tube 65' in FIG. 5.

I claim:

1. An irrigation system comprising a supply conduit from a source of fluid under pressure, a control valve in said conduit, at least one pressure tank having an inlet port, said supply conduit connected to said port, a discharge port means connected to said tank, a check valve means between the supply conduit and said inlet port means to said tank, a substantially flat diaphragm control valve having two faces, one face closing the said discharge port and the other face exposed to the supply conduit, said check valve having an opening pressure greater than the closing pressure of said diaphragm control valve.

2. An irrigation device for the supply of a controlled amount of water from a source to soil comprising a pressure vessel, an opening to said vessel, a conduit from said source to said opening in said vessel, a substantially flat diaphragm control valve having two faces, one face closing the opening and the other face exposed to the supply of water in said conduit, an inlet opening through said diaphragm having a check valve, a source of water in a conduit, said source connected to said inlet opening through said check valve, and an outlet passage communicating with the interior of said vessel through said opening.

3. An irrigation device as in claim 2 wherein the check valve in the inlet opening is spring loaded.

4. An irrigation device as in claim 2 wherein the check valve is a tubular member with a free check ball located therein.

* * * * *